United States Patent [19]

Seki et al.

[11] Patent Number: 4,922,124
[45] Date of Patent: May 1, 1990

[54] ARRANGEMENT FOR CONNECTING PLURAL SELF-COMMUTATED VOLTAGE TYPE INVERTERS TO A UTILITY GRID

[75] Inventors: Nagataka Seki; Shunich Hirose, both of Tokyo, Japan

[73] Assignee: Kabushiki Kaisha Toshiba, Kawasaki, Japan

[21] Appl. No.: 291,160

[22] Filed: Dec. 28, 1988

Related U.S. Application Data

[63] Continuation-in-part of Ser. No. 279,277, Dec. 21, 1988, which is a continuation-in-part of Ser. No. 198,851, May 26, 1988, abandoned.

[30] Foreign Application Priority Data

Dec. 28, 1987 [JP] Japan .................. 62-330084

[51] Int. Cl.⁵ .......................................... H02M 7/48
[52] U.S. Cl. ..................... 307/87; 323/207; 363/49; 363/72
[58] Field of Search ................ 363/35, 49, 51, 54, 363/72, 58; 307/45, 77, 82, 83, 85–87; 323/207; 361/91

[56] References Cited

U.S. PATENT DOCUMENTS

| | | | |
|---|---|---|---|
| 3,816,809 | 6/1974 | Kuster | 363/56 |
| 4,133,026 | 1/1979 | Hausler | 363/49 |
| 4,251,735 | 2/1981 | Coleman | 307/46 |
| 4,482,031 | 11/1984 | Yoshida et al. | 363/35 |
| 4,488,200 | 12/1984 | Matsuzaki | 363/58 |

FOREIGN PATENT DOCUMENTS

| | | |
|---|---|---|
| 58-51742 | 3/1983 | Japan . |
| 59-59081 | 4/1984 | Japan . |
| 157270 | 7/1986 | Japan . |
| 118777 | 5/1987 | Japan . |
| 63-22130 | 3/1988 | Japan . |

OTHER PUBLICATIONS

Technical Progress Report–U.S. DOE "Advanced Converter Technology", for period May 23, 1979 through May 22, 1980, prepared by United Technologies Corporation under Contract DE-AC01-7-9ET29079.

IEEE Transaction on Power Apparatus and Systems, vol. PAS-98, No. 4, Jul./Aug. 1979, pp. 1466-1475.

S. Hirose et al., "Multi-Microcomputer-Based Controller for 12MW GTO Power Conditioning Systems" IEEE PESC'88, Apr. 11, 1988.

G. A. Phillips et al., "Progress in Self-Commutated Inverter for Fuel Cells and Batteries" IEEE PES Summer Meeting in Jul. 1978.

*Primary Examiner*—William H. Beha, Jr.
*Attorney, Agent, or Firm*—Oblon, Spivak, McClelland, Maier & Neustadt

[57] ABSTRACT

A power converter device including a plurality of self-commutated voltage type converter each connected to a common d.c. circuit, a plurality of transformers each having d.c. windings and a.c. windings, each of the d.c. windings being connected to an a.c. output terminal of a respective one of the converters and each of the a.c. windings being connected in series, an a.c. switch through which the serially connected a.c. windings of the transformers are adapted to be connected to a utility power system, and a d.c. overvoltage suppression device, installed in the common d.c. circuit, wherein the transformers are connected to the utility power system by synchronous making, and the d.c. overvoltage suppression device is connected to the common d.c. circuit when the converters are stopped temporarily.

15 Claims, 6 Drawing Sheets

FIG. 6.
(a) TRANSIENT STATE
(b) STEADY STATE

ARRANGEMENT FOR CONNECTING PLURAL SELF-COMMUTATED VOLTAGE TYPE INVERTERS TO A UTILITY GRID

CROSS-REFERENCE TO RELATED APPLICATIONS

This application is a continuation-in-part of pending U.S. application Ser. No. 07/279,277 filed December 21, 1988 which is a continuation of abandoned U.S. application Ser. No. 07/198,851 filed May 26, 1988.

BACKGROUND OF THE INVENTION

1. Field of the Invention:

This invention relates to a power converter device for interconnecting alternating current systems, and more particularly to a power converter device wherein the alternating current windings of a plurality of transformer units are connected in series, and are respectively connected to a plurality of self-commutated voltage type converter units.

Figure 4:
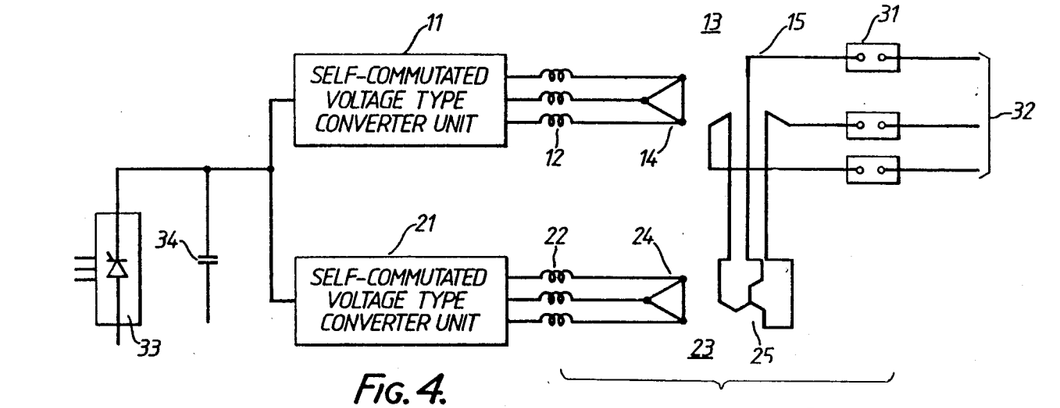
FIG. 4 is a schematic block diagram of a conventional power converting device.

2. Discussion of Background:

FIG. 4 shows a schematic block diagram of a conventional widely used power converter device for interconnecting alternating current systems. Reference numerals 11 and 21 designate three-phase self-commutated voltage type inverter units (hereinbelow called inverter units); 12, 22 designate system interconnecting reactors; 13, 23 designate isolating transformer units; 14, 24 designate windings of transformer units 13, 23; 15, 25 likewise designate a.c. windings.

The a.c. windings 15 and 25 of transformer units 13, 23 are connected in series in each phase. Their outputs are connected to a.c. system 32 through a.c. switches 31. In contrast, both the d.c. sides of inverter units 11 and 21 have a common d.c. power source 33. The a.c. windings 15 and 25 of transformer units 13 and 23 form what is called a zig-zag connection. This is a widely used method of connection in order to obtain the advantage that, when inverter units 11 and 21 are operated within a mutual phase difference of 30°, no harmonic components other than the $(12\,p \pm 1)$-th order harmonics $(p=1, 2 \ldots)$ are contained in the resultant output of transformer units 13 and 23.

Operation of the conventional power converter device for line interface shown in FIG. 4 is initiated as follows. Inverter units 11, 21 are started in operation by a signal from a control circuit, not shown. The rise of the output voltage of inverter units 11, 21 from zero is made gradual, to avoid excitation rush current in transformer units 13, 23. A.C. switches 31 are closed when the amplitude and phase of the resultant voltage of a.c. windings 15, 25 of transformer units 13, 23 coincide with the amplitude and phase of the voltage of the utility line 32. This is called synchronous making. In case of malfunction of a.c. utility line 32, a.c. switches 31 are opened simultaneously with cessation of operation of inverter units 11, 21. Since the time from stopping of inverter units 11, 21 and opening of a.c. switches 31 is less than 0.1 second, the problem to be discussed below does not occur.

Line-interactive self-commutated inverters have recently begun to be used in systems such as photovoltaic systems or fuel cell systems. Line interface based on self-commutated inverters, in the case where the a.c. system is weak, are of superior stability compared with line interface based on line-commutated inverters. The reason for this is that, in the case of line-commutated inverters, commutation of the thyristors depends on the voltage of the utility line, so commutation of the thyristors may be prevented by disturbances, i.e. so-called commutation failure occurs. To deal with this, in the case of a self-commutated inverter, commutation of the thyristor is performed by a commutation circuit within the inverter or the device itself, so disturbance of the system voltage does not immediately result in commutation failure. However, in the aforementioned operation control system, operation of inverter units 11, 21 may be temporarily cut off by generation of a.c. overcurrent if for example there is an instantaneous voltage fluctuation of the a.c. utility line. In this case, it is difficult to restart the operation immediately when the voltage is reset. The reason for this is that a.c. switches 31 must open whenever a.c. overcurrent occurs. This gives rise to the problem that: (a) once stoppage has occurred, about five seconds is required from recommecement of operation until synchronous making, and (b) the life of a.c. switches 31 is adversely affected by frequent switching of a.c. switches 31.

If it is assumed that an operating scheme is chosen according to which closure of a.c. switches 31 is followed by operation of the inverter, it might be thought that, for the aforementioned overcurrent protection, it would be sufficient simply to stop the operation of the inverter, i.e., simply to stop the on/off operation of the gate of the GTOs. This ought to have the effect of stopping a.c. switches 31 from opening. However, it has been found that there are two problems in doing this. One is the d.c. overvoltage generated in the transient period when the connection of the transformers to the system is closed, and the other is the d.c. overvoltage in the steady state.

First discussed is the d.c. overvoltage in the transient period. Since, as shown in FIG. 4, a.c. windings 15 and 25 are connected in series, if, at the instant when a.c. switches 31 are closed, the a.c. voltage is not applied to the two transformers 13 and 23 equally, the result is the appearance of distorted voltages having a high peak, quite different from a sine wave. The first cause of this is that the initial magnetization state of the two transformers is not the same. The second cause is that there is high impedance for high frequencies of harmonic order other than $12\,p \pm 1$ $(p=1, 2 \ldots)$, because of the zig-zag connection, so the harmonic exciting current components needed to induce a sine wave voltage cannot flow. That is, the excitation characteristic of the iron core is not totally linear, but rather is a non-linear curve having hysteresis. Since, in order to create a sine wave voltage high frequencies must be contained in the exciting current, if there is some restriction that prevents these high frequency components from flowing, the induced voltage will not be a sine wave.

In experiments, on transition, the peak value of the voltage induced in d.c. windings 14 and 24 of transformer units 31 and 23 was about 2.9 times the root mean square value of the sine wave. The d.c. voltage of the capacitor 34 is therefore charged up to this value.

Figure 6:
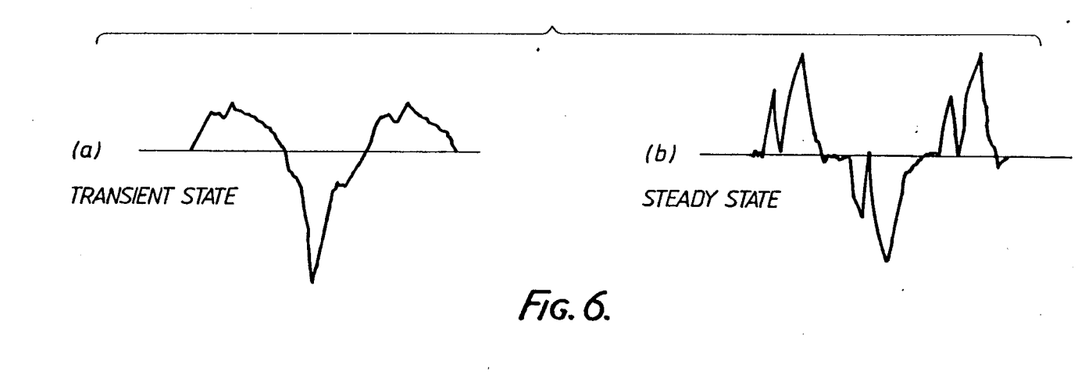
FIG. 6 is an illustration of d.c. winding voltage waveforms of the transformer units in the conventional device of FIG. 4.

The second problem concerns d.c. overvoltage in the steady state. As described above, the induced voltage is not a simple sine wave, but contains harmonic components. In experiments a peak value of about 2.4 times the root mean square value of the sine wave appears. The d.c. voltage of the capacitor 34 was charged up to this value. FIG. 6 shows measured waveforms obtained by experiment as described above.

In the above description, it is assumed that inverter units 11 and 21 are employed. However, this invention is applicable not merely to conversion from d.c. to a.c., but also to reactive power compensator devices, or rectifiers whose power factor can be regulated, so hereinbelow, numerals 11 and 21 refer generally to self-commutated voltage type converters, and the whole system will be taken as being a power converter device.

SUMMARY OF THE INVENTION

Accordingly, one object of this invention is to provide a new and improved power converter device having a plurality of self-commutated voltage type converter units and corresponding transformer units, provided with effective means of preventing d.c. overvoltage generated, in the case where the a.c. windings of the transformer units are connected in series, when the transformer units are connected to the a.c. system.

The above and other objects are achieved according to the invention by providing a power converter device in which excess transient voltage when the transformer units are connected to utility power systems is prevented by synchronous making.

Also, by providing a d.c. overvoltage suppression device consisting of a resistor and circuit breaker device connected in series in the d.c. circuit, the voltage waveform when the converter units are stopped temporarily can be made to approach more closely to a sine wave, thereby suppressing overvoltage of the d.c. circuit.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
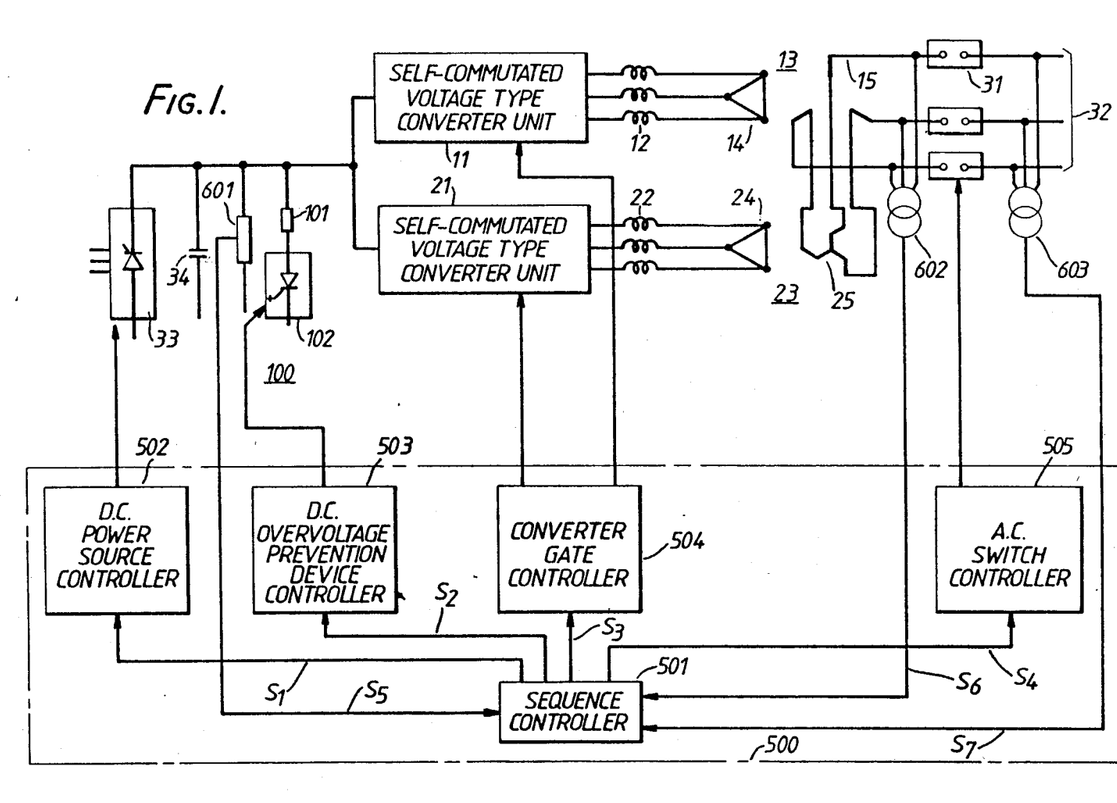
FIG. 1 is a schematic block diagram showing an embodiment of the present invention.

Referring now to the drawings, wherein like reference numerals designate identical or corresponding parts throughout the several views, and more particularly to FIG. 1 thereof, an embodiment of this invention will be described. In FIG. 1, reference numeral 100 designates a d.c. overvoltage suppression device. This consists of a resistor 101 and circuit breaker device 102.

Reference numerals 11 and 21 designate the self-commutated voltage type converter units.

Figure 5:
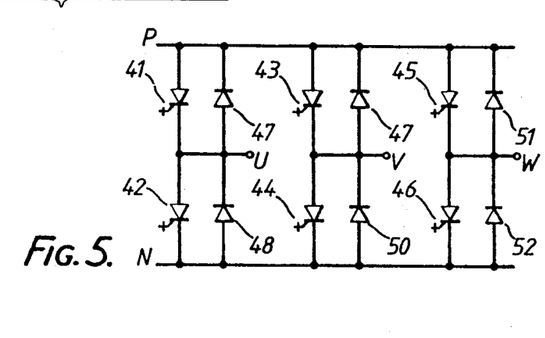
FIG. 5 is a circuit diagram showing a specific example of a self-commutated voltage type converter unit.

A typical example of self-commutated voltage type converter units 11 and 21 is shown in FIG. 5. In this figure, reference numerals 41 to 46 designate GTOs, and 47 to 52 designate diodes. This inverter circuit has recently been very widely employed, so a detailed description of it will be omitted.

Before this power converter device is interconnected to the system, with a.c. switch 31 open, first of all d.c. power source 33 is powered up, and self-commutated voltage type converter units 11 and 21 are operated. At the time t1 in FIG. 8, start signal S1 is supplied to a d.c. power source controller 502 from sequence controller 501, a d.c. power source controller 502 supplies gate pulse to the thyristor rectifier of d.c. power source 33. Reference numeral 601 designates a d.c. voltage detector, which detects d.c. voltage of the output voltage of d.c. power source 33. The voltage of d.c. power source 33 can be gradually increased by phase control of the thyristor rectifier as shown by a signal S5 in FIG. 8. Rush current to capacitor 34 is therefore restricted.

Figure 8:
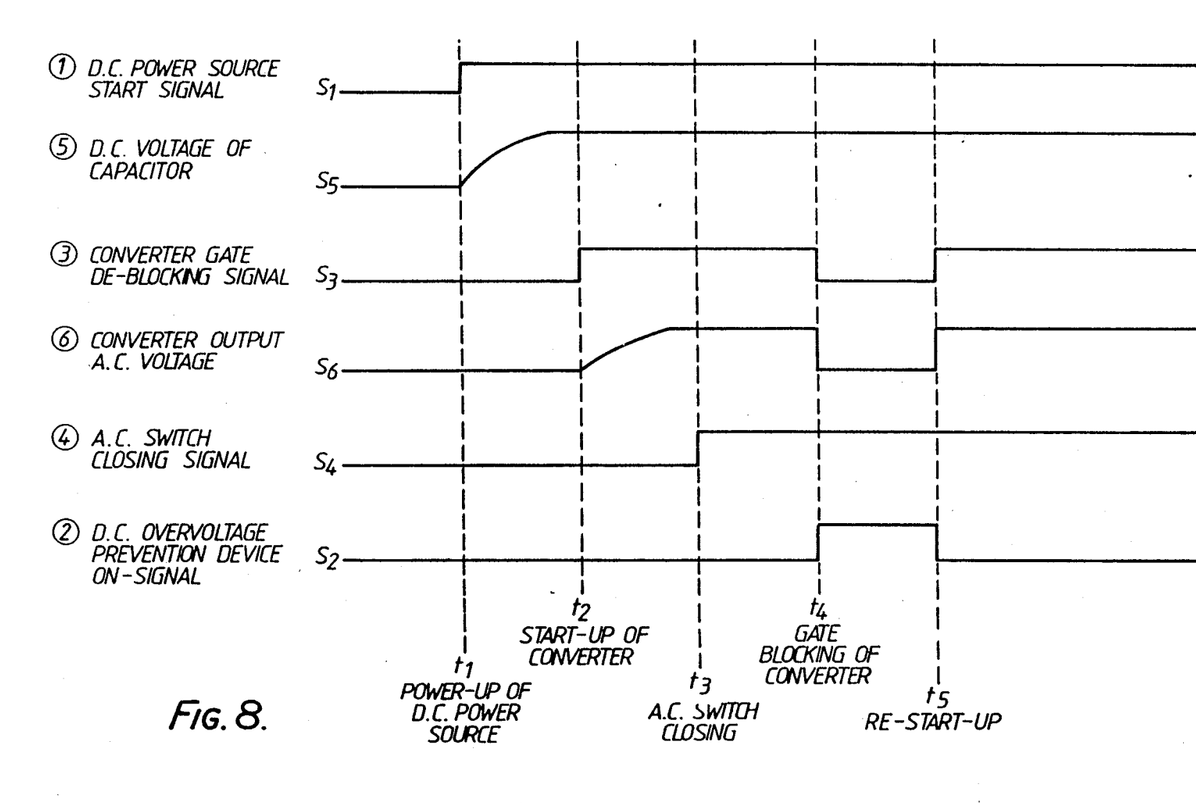
FIG. 8 is a timing chart showing an example of an operation of the device in FIG. 1.

After the d.c. power source 33 is powered up to the prescribed voltage, at the time t1 in FIG. 8, the sequence controller 501 supplies converter gate deblocking signal S3 to a converter gate controller 504. The self-commutated voltage type converter unit 11, 21 are started up by a gate pulse from the converter gate controller 504.

In order to avoid rush current in transformer units 13 and 23, the output voltage of self-commutated voltage type converter units 11 and 21 is gradually raised from zero. The methods by which this can be done include the method of gradually starting up d.c. power source 33 and the method of using voltage regulation means of self-commutated voltage type converter units 11, 21 themselves. The d.c. windings 15 and 25 of the two transformer units 13 and 23 are connected in series. Their resultant voltage is controlled by a control device 500, so as to coincide, in amplitude and phase, with the system voltage. Potential transformers 602, 603 detect the voltage S6 of the side of transformer units 13, 23 and the voltage S7 of the side of the system 32, respectively, and supply them to the sequence controller 501.

The converter gate controller 504 supplies gate pulse to switching elements 41 to 46 of the self-commutated voltage type converter unit 11, 21 so as to produce coincidence of the voltage S6, in amplitude and phase, with the voltage S7. Once such coincidence is achieved, the sequence controller 501 supplies a.c. switch closing signal S4 to an a.c. switch controller 505, a.c. switch 31 is closed. That is, synchronous making is performed.

Next, a method of control will be described whereby the power converter is started up again after its operation has been temporarily stopped due to some external causes such as lowering of the system voltage, frequency abnormality, or a temporary drop in d.c. power source voltage. When some abnormality is detected by a voltage abnormality detector (not shown), stopping the converter gate de-blocking signal 53 at the time t4, gate (base) blocking of semiconductor switching elements 41 to 46 of self-commutated voltage type converter units 11 and 21 is immediately performed. At the same time, the sequence controller 501 supplies d.c. overvoltage prevention device on-signal S2 to a d.c. overvoltage prevention device controller 503, the d.c. overvoltage prevention device controller 503 supplies ON gate pulse to the gate of the circuit breaker 102.

This point, a.c. switch 31 is not opened. By "gate (base) blocking" is meant that these semiconductor switching elements 41 to 46 are put into the OFF condition, their switching operation being thereby stopped. For example, if semiconductor switching elements 41 to 46 are gate turn-off thyristors (GTOs), application of an OFF gate pulse puts the GTOs into the OFF state. Negative bias is applied if required. Transformer units 13 and 23 are excited from the a.c. system. For the harmonics, such as the fifth and seventh harmonics, of the high frequency current necessary for induction of a sine wave voltage, that are difficult to supply from the system, a path is formed whereby current flows through diodes 47, 49 and 51 of the upper arm of self-commutated voltage type converter units 11 and 21—resistor 101—circuit breaker 102—diodes 48, 50, 52 in the lower arms of self-commutated voltage type converter units 11, 21. Consequently, the high frequency voltage induced in d.c. windings 14 and 24 of the transformers is very little, resulting in a voltage approximating a sine wave.

By experiment, it has been found that, for the magnitude of the resistor 101, a value of about one-fifth of the total excitation capacity of transformer units 13, 23 is suitable. If therefore it is provisionally assumed that the excitation capacity is 2%, a resistor of capacity (i.e. capacity of power in units of watts, for example) about 0.4% should be inserted in the d.c. circuit. In other words, the rated capacity, in watts, of the resistor should be 0.4% of the rated capacity of transformer units 13, 23. However, this is a factor lowering the efficiency during operation, so in cases where high efficiency is required, it is desirable to arrange for insertion and removal of a resistor to be linked to the change-over between stopping and operation. In this case, circuit breaker device 102 may appropriately be a semiconductor switching element such as a GTO.

The rated capacity of resistor 101 in FIG. 1 is preferably low, since a delta connection of transformer d.c. windings 14, 24 has smaller impedance to the third harmonic and the ninth harmonic, etc. In the case of a Y connection, the rated capacity of resistor 101 should be about half the transformer excitation rated capacity.

In re-start-up of the power converter after removal of the abnormal condition, control is performed as follows.

At the time t5, the sequence controller 501 supplies the converter gate de-blocking signal 53 to the converter gate controller 504, the converter gate controller 504 supplies gate pulse to the switching elements 41 to 46 of self-commutated voltage type converter unit 11, 21.

The gate pattern supplied to semiconductor switching elements 41 to 46 of self-commutated voltage type converters 11 and 21 is found by calculation in a control circuit, and is such that, when they are driven with this gate pattern, the magnitude and phase of the resultant voltage of the transformers coincides with the magnitude and phase of the system voltage. This gate pattern effects deblocking of the gates (bases) of semiconductor switching elements 41 to 46.

"Gate (base) deblocking" means a condition in which the switching action of semiconductor switching elements 41 to 46 is thereby brought about. On gate (base) deblocking, the output voltage of the self-commutated voltage type converter is applied stepwise to transformer units 13 and 23. However, since the transformer units are already excited by the a.c. system, an excess excitation rush current cannot flow. Breaker 102 is turned off concomitantly with gate (base) deblocking. Breaker 102 is turned off by supplying OFF gate pulse to the gate of the breaker 102 from the d.c. overvoltage prevention device controller 503, because d.c. overvoltage prevention device on-signal S2 is stopped at the time t5.

Thus, temporary operation interruption and operation restarting of the power converter can be carried out by gate (base) blocking and deblocking of semiconductor switching elements 41 to 46, together with connection and disconnection of circuit breaker 102.

Figure 2:
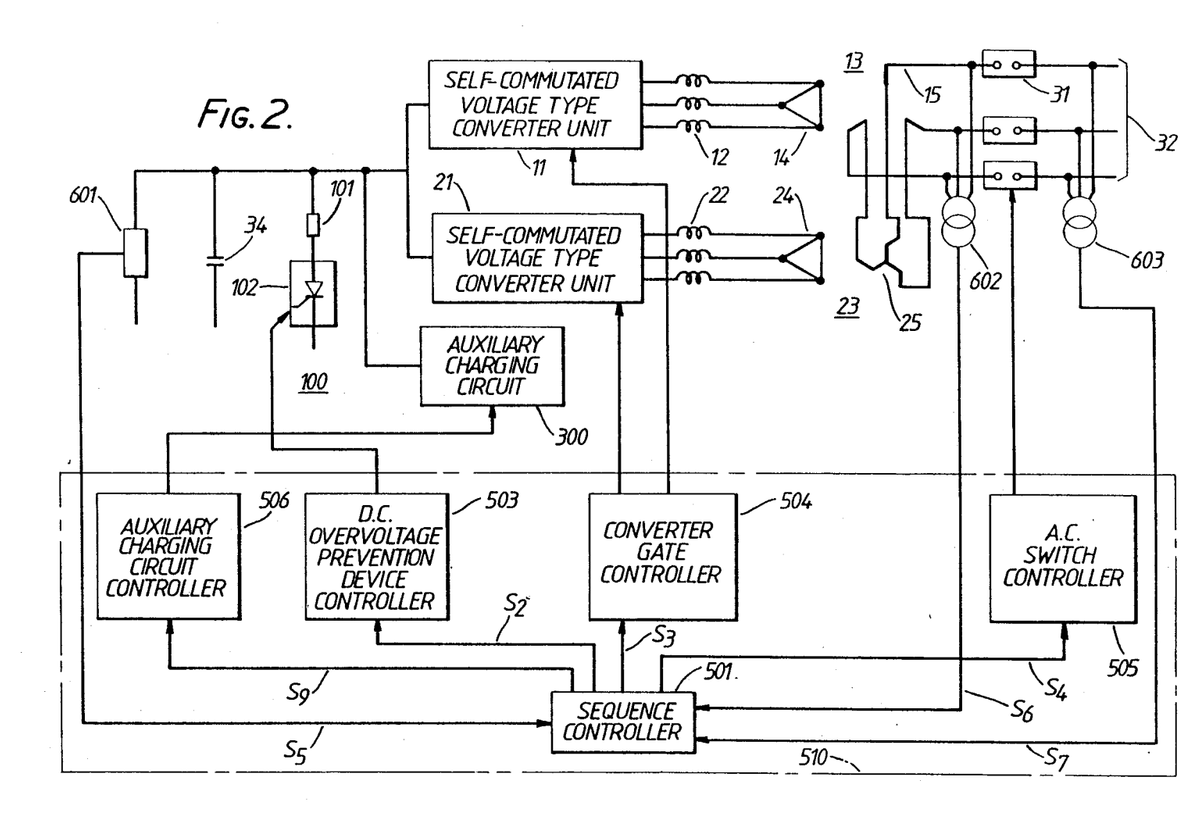
FIG. 2 is a schematic block diagram showing another embodiment of the present invention.
Figure 3:
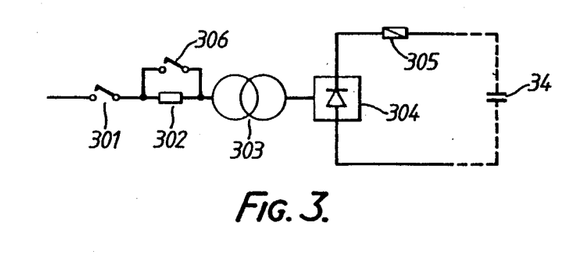
FIG. 3 is a circuit diagram showing an example of a preparatory charging circuit in FIG. 2.

FIG. 2 shows another embodiment of this invention. The difference from FIG. 1 is that there is no d.c. power source 33, an auxiliary charging circuit 300 for capacitor 34 being provided instead. This type of construction can be applied to a reactive power regulator. Auxiliary charging circuit 300 may consist for example, as shown in FIG. 3, of a.c. switches 301, 306, resistor 302, transformer 303, rectifier 304 and fuse 305.

When a.c. switch 301 is closed, capacitor 34 is charged through the path: resistor 302—transformer 303—rectifier 304—fuse 305. The magnitude of the charging circuit to capacitor 34 is restricted by resistor 302.

Figure 9:
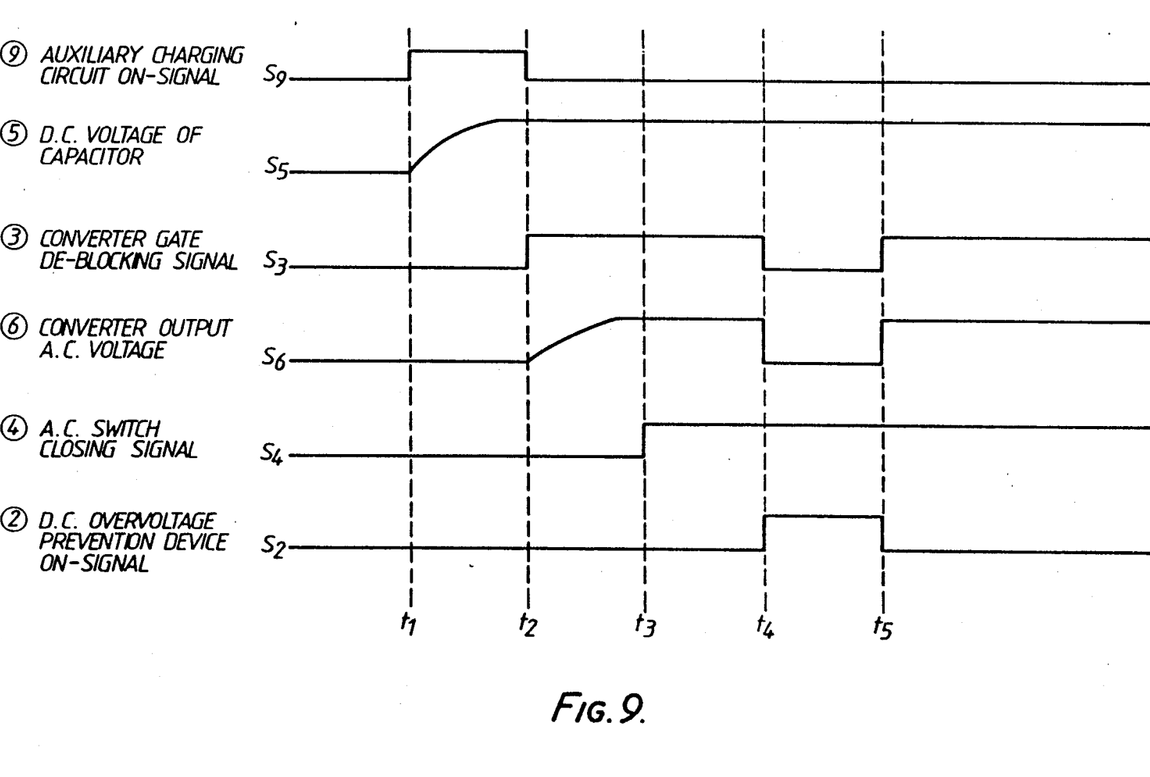
FIG. 9 is a timing chart showing an example of an operation of the device in FIG. 2.

When capacitor 34 is charged to the prescribed voltage, or when it is charged to practically the prescribed voltage, a.c. switch 306 is opened. At the time t1 in FIG. 9, the sequence controller 501 supplies auxiliary charging circuit on-signal S9 to an auxiliary charging circuit controller 506. The auxiliary charging circuit controller 506 make the a.c. switch 301 close. After the capacitor 34 is charged to the prescribed voltage, at the time t2, auxiliary charging circuit on-signal S9 is stopped. After this, as described with reference to FIG. 1, the output voltages of self-commutated voltage type converter units 11 and 21 are gradually raised, the resultant voltage of a.c. windings 15 and 25 of the two transformer units 13 and 23 are controlled such as to coincide with the system voltage, and a.c. switch 31 is closed. A.c. switches 301 and 306 of the auxiliary charging circuit are then opened. D.c. overvoltage prevention device 100 is not used at all in this process. Or rather, if it were used, it would cause insufficiency of the capacity of auxiliary charging circuit 300. The reason why d.c. overvoltage prevention device 100 is needed is to temporarily interrupt operation of the power converter in the condition where a.c. switch 31 is closed. The operation of d.c. overvoltage prevention device 100 is then the same as described above, so an explanation of it is omitted.

Next, the gate pattern applied to the semiconductor switching elements on operation restarting will be described.

Assuming that the d.c. voltage is $E_d$, and the resultant voltage of the transformer output is $E_{ac}$, in general the following relationship exists:

$$E_{ac} = k\, E_d f(\theta, \alpha) \qquad (1)$$

where:

k is a constant uniformly determined by the transformation ratio of the transformers, the number of units connected in series, and the mode of the inverter unit control (for example, PWM control);

$\theta$ is the voltage phase difference between the resultant voltage and the system; and α is the control angle (or degree of modulation) of PWM control.

When load is applied, a voltage drop is produced in the transformers themselves, or in the line interface reactor, thereby producing a change in the resultant voltage. Assuming that, on start-up, $\theta=0$, and $E_{ac}=E_{sy}$ (system voltage), so that the current is 0, the control angle α can be found by substituting the values of $E_d$ and $E_{sy}$ in equation 1. Since the transformers are excited from the a.c. system, there is absolutely no need to devise a method of starting up such as to prevent excitation rush current of the transformers, and a gate pattern may be supplied to semiconductor switching elements 41 to 46 of self-commutated voltage type converter units 11, 21 such as to give $\theta=0$ at the control angle α found by this calculation. Since, depending on the type of semiconductor switching elements, there may be a restriction of the minimum ON period (minimum period of the ON condition) or minimum OFF period (minimum period of the OFF condition), it may happen that, when gate (base) deblocking is performed from an arbitrary time point, the conditions given above are not satisfied. However, a partial alteration of the gate pattern can be performed such that this restriction is satisfied. Consequently, there is no problem in performing gate (base) deblocking of the semiconductor switching elements with a.c. switch 31 still closed.

As embodiments of this invention, examples have been illustrated in FIG. 1 and FIG. 2 showing in each case two inverter units and two transformer units. Examples of delta connection of a.c. windings 25 of transformer unit 23 to provide a transformer unit connection to remove specific higher harmonics are given in the literature (for example, the delta connection connected as shown at page 172 of "Turnoff Thyristors" compiled by N. Seki, M. Kurata, and M. Takeuchi published by Denki Shoin on April 20th 1983).

This invention can be applied to other connections such as systems for removing high frequencies other than 18 p±1 (p=1, 2 . . . ) by using three sets of transformer units with a mutual phase difference of 20°.

Reactors 12 and 22 in FIG. 1 and 2 are provided between inverter units 11 and 21 and transformer units 13 and 23. However, this invention could be applied also in the case where reactors are provided between a.c. switches 31 and transformer units 13 and 23. Specifically, although reactors 12 and 22 have a current limiting effect on transformer units 13 and 23, normally reactors 12 and 22 are at the most about 20%, where 20% indicates the value of percent impedance of reactors 12, 22, which is too small in relation to the approximately 50% value that is needed to achieve the objective of current limitation.

The d.c. power source referred to here means an irreversible power source such as a thyristor rectifier, fuel cell, or solar cell etc. and does not include a storage battery.

Figure 7:
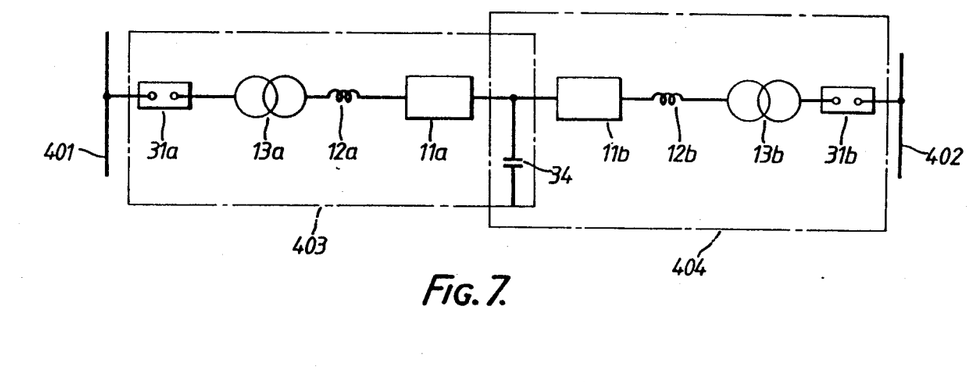
FIG. 7 is a schematic block diagram showing an example of a system to which the present invention is applied.

However, in a system that performs a.c.—d.c.—a.c. conversion, as in the case of a d.c. power transmission system, use of a system as shown in FIG. 7 may be considered, in which the circuit shown in FIG. 1 is employed with two d.c. parts in common. In FIG. 7, reference numerals 401 and 401 designate different systems, 403 and 404 designate the power converter device described in FIG. 1, and these have their d.c. parts in common. In the d.c. power transmission system of FIG. 1, this invention can be applied when one of the a.c. switches at both ends is closed. It should be noted that insertion of a resistor in the conventional d.c. circuit was carried out in the following cases:

(a) for discharge of d.c. circuit capacitors; and
(b) in a motor drive inverter, for consumption of regenerated energy from the motor.

First of all, in case (a), the resistor is normally a high resistance, with the objective of discharge, and stays inserted during operation. This is similar to the present invention in that resistance is low when discharge is a short time is required during stoppage, or is used only during stoppage. However, in this case, the resistance is determined by the capacity of the capacitor and the necessary discharge time, and the resistor stays inserted a short time. In contrast, in the case of the present invention, as described above, the resistance is determined by the excitation capacity of transformers 13 and 23, and the period for which it is applied is unrelated to the resistance.

Whereas in case (b), a resistor is required during operation, in this invention, the resistor is used during stoppage. Thus, although the circuit is similar, the object of use and conditions of use are clearly different.

In power converter systems for line interface employing self-commutated voltage type converters, an example wherein the transformer effects initial charging from the system is described in I.E.E.E. Transactions on Power Apparatus and Systems, Volume PAS-98, No. 4, July/August, 1979, "Progress in Self-Commutated Inverters for Fuel Cells and Batteries" GA Phillips, J E Walton, F J Kornbrust (UTC). FIG. 1 in this reference shows a power converter system of one MW. However the output of three unit inverters is connected to a single transformer, so the phenomenon of the voltage distribution between the unit transformers becoming unbalanced when the a.c. switch is closed does not arise, and the resistor (termed a preloading resistor) shown in these drawings and thyristor switch are provided to protect the fuel cell. Regarding its capacity, it is stated to require from one quarter to one half (15 second rating) of the generated output of the fuel cell, which is different from the objective and action of the present invention.

As described above, with this invention, the aim is to prevent overvoltage generated in the d.c. winding side when inserting a transformer unit in parallel into the system, and to protect the windings and prevent d.c. overvoltage, and also, in the steady state after insertion in parallel in the system, to prevent d.c. overvoltage by suppressing high frequencies generated in the d.c. windings.

Thanks to this, there is no need to design a self-commutated voltage type converter unit or d.c. circuit capacitor that can withstand high d.c. voltage; costs can be brought down to an appropriate level; and reliability can be improved. Also, the problem of imbalance of the excitation impedance of the transformer units affecting the voltage distribution between the transformer units so that one or the other has its capacitor charged to a higher voltage is alleviated, because the insertion of a resistor increases the amount of allowed scatter of the excitation impedance of the transformers, although a description of this has been omitted. This facilitates transformer manufacture.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter device, comprising:
   a plurality of self-commutated voltage type converters, each connected to a common d.c. circuit;
   a plurality of transformers, each having d.c. windings and a.c. windings, each of the d.c. windings being connected to an a.c. output terminal of a respective one of the converters and each of the a.c. windings being connected in series;
   an a.c. switch means, through which the serially connected a.c. windings of said transformers are adapted to be connected to a utility power system;
   a capacitor provided in said common d.c. circuit;
   a d.c. overvoltage suppression means connected in parallel with said common d.c. circuit and including a series circuit of a resistor element and an interrupter switch means;
   wherein said converters are started and said interrupter switch means is opened before closing said a.c. switch means,
   said a.c. switch means is closed when the amplitude and phase of the resultant voltage of a.c. windings of said transformers approximately coincide with the amplitude and phase of the voltage of the utility power system,
   the operation of said converters is stopped and said interrupter switch means is closed when a temporary stopping of the device is required, and
   said interrupter switch means is opened when the device is restarted.

2. A power converter device according to claim 1, further comprising:
   voltage control means for increasing the voltage of said d.c. circuit gradually.

3. A power converter device according to claim 1, further comprising:
   a voltage regulation means for increasing the output of voltage of said converters gradually.

4. A power converter device according to claim 1, further comprising:
   a gate blocking means for stopping the operation of said converters; and
   a gate deblocking means for restarting the operation of said converters.

5. A power converter device according to claim 2, further comprising:
   a gate blocking means for stopping the operation of said converters; and
   a gate deblocking means for restarting the operation of said converters.

6. A power converter device according to claim 3, further comprising:
   a gate blocking means for stopping the operation of said converters; and
   a gate deblocking means for restarting the operation of said converters.

7. A power converter device according to claim 1, further comprising:
   a base blocking means for stopping the operation of said converters; and
   a base deblocking means for restarting the operation of said converters.

8. A power converter device according to claim 2, further comprising:
   a base blocking means for stopping the operation of said converters; and
   a base deblocking means for restarting the operation of said converters.

9. A power converter device according to claim 3, further comprising:
   a base blocking means for stopping the operation of said converters; and
   a base deblocking means for restarting the operation of said converters.

10. A power converter device, comprising:
    a plurality of self-commutated voltage type converters, each connected to a common d.c. circuit;
    a plurality of transformers, each having d.c. windings and a.c. windings, each of the d.c. windings being connected to an a.c. output terminal of a respective one of the converters and each of the a.c. windings being connected in series;
    an a.c. switch means, through which the serially connected a.c. windings of said transformers are adapted to be connected to a utility power system;
    a capacitor provided in said common d.c. circuit;
    a precharging means for precharging said capacitor;
    a d.c. overvoltage suppression means connected in parallel with said common d.c. circuit and including a series circuit of a resistor element and an interrupter switch means;
    wherein said precharging means is connected to said common d.c. circuit, said capacitor is charged by said precharging means, and said interrupter switch means is opened before starting said converters,
    said converters are started when said capacitor is charged to the prescribed voltage approximately,
    said a.c. switch means is closed and said precharging means is disconnected from said d.c. circuit when the amplitude and phase of the resultant voltage of a.c. windings of said transformers approximately coincide with the amplitude and phase of the voltage of the utility power system,
    the operation of said converters is stopped and said interrupter switch means is closed when a temporary stopping of the device is required, and
    said interrupted switch means is opened when the device is restarted.

11. A power converter device according to claim 10, further comprising:
    a voltage regulation means for increasing the output voltage of said converters gradually.

12. A power converter device according to claim 10, further comprising:
    a gate blocking means for stopping the operation of said converters; and
    a gate deblocking means for restarting the operation of said converters.

13. A power converter device according to claim 11, further comprising:
    a gate blocking means for stopping the operation of said converters; and
    a gate deblocking means for restarting the operation of said converters.

14. A power converter device according to claim 10, further comprising:
    a base blocking means for stopping the operation of said converters; and
    a base deblocking means for restarting the operation of said converters.

15. A power converter device according to claim 11, further comprising:
    a base blocking means for stopping the operation of said converters; and
    a base deblocking means for restarting the operation of said converters.

* * * * *